United States Patent
Schreter (10) Patent No.: US 9,519,673 B2
(45) Date of Patent: Dec. 13, 2016

(54) MANAGEMENT OF I/O AND LOG SIZE FOR COLUMNAR DATABASE

(75) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 988 days.

(21) Appl. No.: 13/215,726

(22) Filed: Aug. 23, 2011

(65) Prior Publication Data

US 2013/0054532 A1 Feb. 28, 2013

(51) Int. Cl.
*G06F 17/30* (2006.01)
*G06F 11/14* (2006.01)

(52) U.S. Cl.
CPC ... *G06F 17/30377* (2013.01); *G06F 17/30315* (2013.01); *G06F 17/30368* (2013.01); *G06F 11/1461* (2013.01); *G06F 11/1471* (2013.01); *G06F 2201/80* (2013.01)

(58) Field of Classification Search
USPC ........ 707/607, 608, 687, 705, 790, 813, 821
See application file for complete search history.

(56) References Cited

U.S. PATENT DOCUMENTS

2012/0221528 A1* 8/2012 Renkes et al. ................ 707/674

OTHER PUBLICATIONS

Jens Krueger et al., "Optimizing Write Performance for Read Optimized Databases", Apr. 1, 2010 (Apr. 1, 2010), Database Systems for Advanced Applications, Springer Berlin Heidelberg, Berlin, Heidelberg, XP019129106, ISBN: 978-3-642-12097-8, (pp. 291-305, 16 pages total).

Mike Stonebraker et al., "C-Store: A Column-oriented DBMS", Proc. 31st VLDB, Trondheim, Norway, Jan. 1, 2005 (Jan. 1, 2005), XP008103215, (pp. 553-564, 12 pages total).

Communication: "The Extended European Search Report", European Patent Office, dated Feb. 19, 2013, for European Application No./Patent No. 120059100-1951 / 2562657, 8pgs.

* cited by examiner

*Primary Examiner* — Sana Al Hashemi

(74) *Attorney, Agent, or Firm* — Buckley, Maschoff & Talwalker LLC (57) ABSTRACT

A system includes reception of a transaction to change a columnar table, recordation of the transaction within a delta structure in a volatile memory, recordation of the transaction within a log of a persisted memory, reception of an instruction to merge the delta structure in the volatile memory with a first instantiation of the columnar table in the volatile memory, and in response to the instruction, merging of the delta structure in the volatile memory with the first instantiation of the columnar table in the volatile memory to create a merged columnar table in the volatile memory, and not storing the merged columnar table in the persisted memory.

16 Claims, 12 Drawing Sheets

Start T1

| Delta (T1) | Table (T1) | Delta (Disk) | Table (Disk) | DB log |
|---|---|---|---|---|
| Insert R4 | R1 | Insert R4 | R1 | |
| Insert R5 | R2 | Insert R5 | R2 | |
| | R3 | | R3 | |

FIG. 5A

Start T1

Start TM

| Delta (T1) | Table (T1) | Delta (TM) | Table (TM) | Delta (Disk) | Table (Disk) | DB log |
|---|---|---|---|---|---|---|
| Insert R4 | R1 | Insert R4 | R1 | Insert R4 | R1 | |
| Insert R5 | R2 | Insert R5 | R2 | Insert R5 | R2 | |
| | R3 | | R3 | | R3 | |

FIG. 5B

Start T1    Insert R6

Start TM

| Delta (T1) | Table (T1) | Delta (TM) | Table (TM) | Delta (Disk) | Table (Disk) | DB log |
|---|---|---|---|---|---|---|
| Insert R4 | R1 | Insert R4 | R1 | Insert R4 | R1 | Insert R6 |
| Insert R5 | R2 | Insert R5 | R2 | Insert R5 | R2 | |
| Insert R6 | R3 | | R3 | | R3 | |

MANAGEMENT OF I/O AND LOG SIZE FOR COLUMNAR DATABASE

FIELD

Some embodiments relate to database systems. In particular, some embodiments concern merging and recovery of transactions on columnar database tables.

BACKGROUND

In a conventional row-based database, each row (i.e., record) of a database table is stored contiguously in memory. Accordingly, if a new record is added to a table, the values of the new record may be appended to the values of the existing records of the table.

Figure 1:
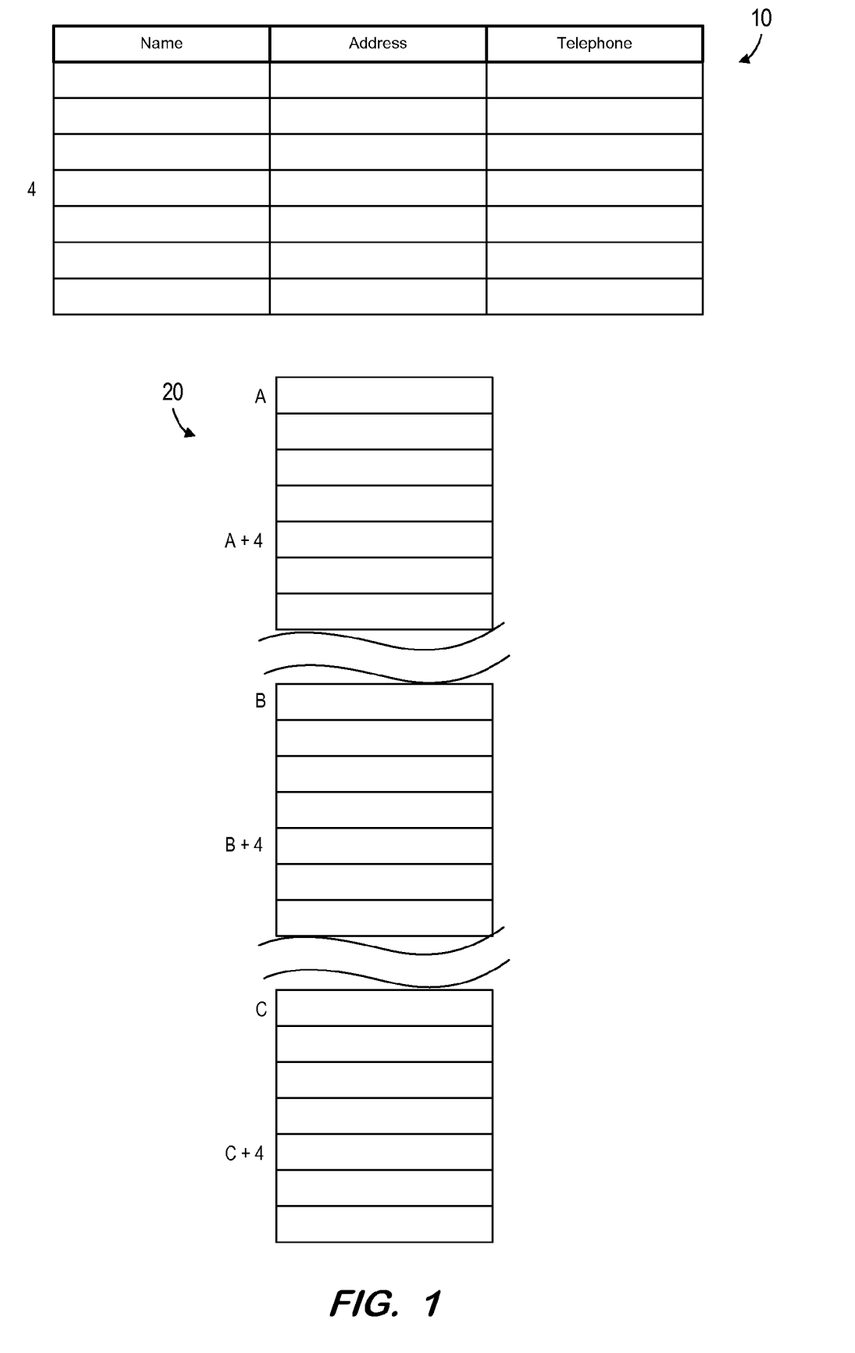
FIG. 1 is a diagram illustrating storage of a columnar table.

In contrast, a columnar database stores values per table column. FIG. 1 shows table 10, including three columns, and memory locations 20 in which the values of table 10 are stored. Memory locations 20 may represent volatile and/or persisted memory.

The values of column Name are stored in locations beginning with memory location A, the values of column Address are stored in locations beginning with memory location B, and the values of column Telephone are stored in locations beginning with memory location C. More specifically, the values of the first record of table 10 are stored at memory locations A, B and C. Similarly, the values of the fourth record of table 10 are stored at memory locations A+4, B+4 and C+4.

If a new record is added to a columnar table, its values are not immediately appended to the memory locations of their respective columns, because such locations may be occupied by values of other columns. Instead, the values of the new record are appended to a delta structure, which stores changes on the table. Once the delta structure reaches a particular size, the data in the delta structure is merged with the actual columnar data of the table (e.g., by adding new values of new records, deleting values of deleted records, and updating values of updated records). This merge results in overwriting entire columns, and the delta structure is thereafter empty.

The foregoing process occurs in volatile memory (e.g., Random Access Memory) and in persisted memory (e.g., disk). That is, each of volatile memory and persisted memory include the actual columnar data and a delta structure which is updated on each transaction. During a merge, the actual columnar data of the volatile memory is merged with the delta structure of the volatile memory and the actual columnar data of the persisted memory is merged with the delta structure of the persisted memory.

Therefore, each merge requires many I/O operations in order to create a new columnar table in persisted memory (i.e., because all table data, not only the changed data, must be processed). These operations negatively affect performance. Moreover, in order to guarantee recoverability of the columnar data, the entire new columnar table must be written to the persisted database log, thereby creating a large log for which a backup is not practical.

DETAILED DESCRIPTION

Figure 2:
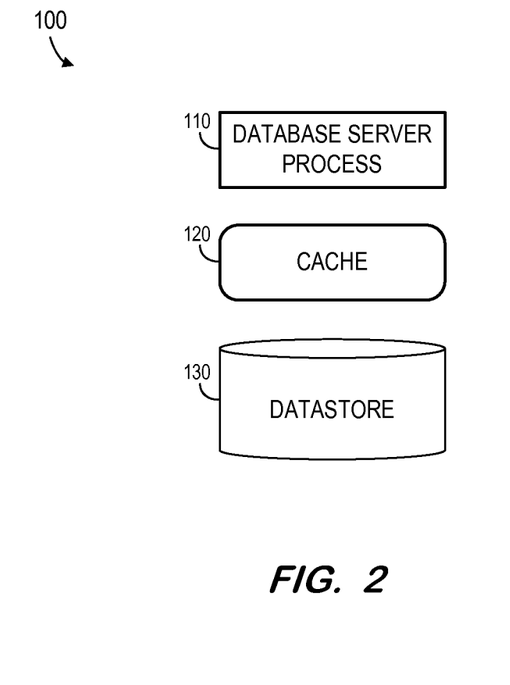
FIG. 2 is a block diagram of a database according to some embodiments.

FIG. 2 is a block diagram of database system 100 according to some embodiments. Database system 100 includes database server process 110, cache 120 and datastore 130.

Database system 100 may communicate with one or more database applications (not shown) over one or more interfaces (e.g., a Structured Query Language (SQL)-based interface). The database applications may provide, for example, business reporting, inventory control, online shopping, and/or any other suitable functions. The database applications may, in turn, support client applications that may be executed by client devices. Such a client application may simply comprise a Web browser to access and display reports generated by a database application.

The data of database system 100 may be received from disparate hardware and software systems, some of which are not interoperational with one another. The systems may comprise a back-end data environment employed in a business or industrial context. The data may be pushed to database system 100 and/or provided in response to queries received therefrom.

Although embodiments are described with respect to database system 100, which is a "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. Database system 100 may also or alternatively support multi-tenancy by providing multiple logical database systems which are programmatically isolated from one another.

Database system 100 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Figure 3:
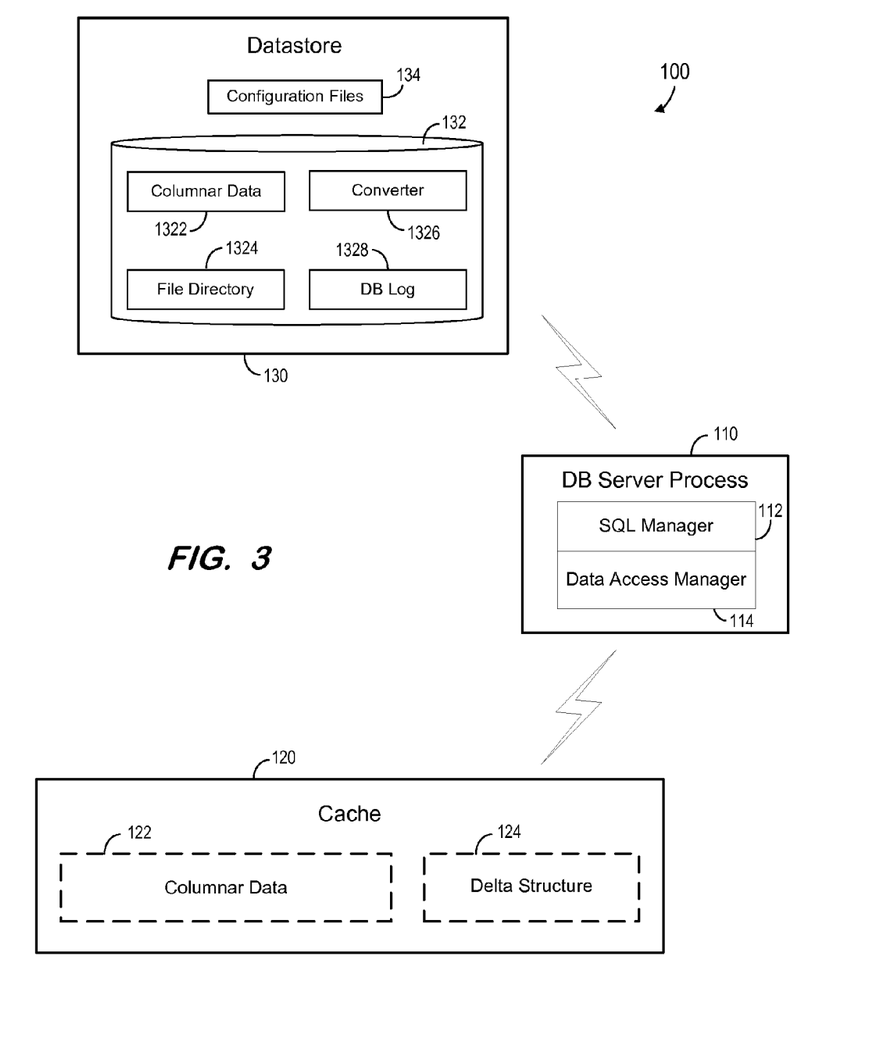
FIG. 3 is a detailed block diagram of a database according to some embodiments.

FIG. 3 is a block diagram of database system 100 according to some embodiments. Database server process 110 may comprise any system for managing a database system that is or becomes known. Generally, database server process 110 may receive requests for data (e.g., SQL requests from a database application), may retrieve the requested data from datastore 130 or from cache 120, and may return the requested data to the requestor. In some embodiments, database server process 110 includes SQL manager 112 to process received SQL statements and data access manager 114 to manage access to stored data. Database server process 110 may also perform start-up, logging, recovery, management, optimization, monitoring, indexing, integrity checks and other database-related tasks.

Database server process 110 may comprise and/or may be implemented by computer-executable program code. For example, database system 100 may comprise one or more hardware devices, including at least one processor to execute program code so as to cause the one or more hardware devices to provide database server process 110.

Datastore 130 may also include configuration files 134 defining properties of database system 110 (e.g., a size and physical location of each data volume, a maximum number of data volumes in datastore 130, etc.). Moreover, datastore 130 typically includes system files, database parameters, paths, user information and any other suitable information. Datastore 130 may also store a database catalog including metadata describing the database objects that are stored therein.

For purposes of the foregoing description, it will be assumed that datastore 130 comprises only data volume 132. Datastore 130 may comprise one or more data volumes in some embodiments, with each of the one or more data volumes comprising one or more disparate physical systems for storing data. These physical systems may comprise a portion of a physical hard disk, an entire physical hard disk, a storage system composed of several physical hard disks, and/or RAM.

Generally, data volume 132 is subdivided into storage areas known as blocks, and columnar data 1322 is stored in data volume 132 in data pages, each of which has the same size as a block. Accordingly, a particular data page of datastore 130 may be accessed by referencing the data volume and block address associated with that data page. Columnar data 1322 will generally be assumed to include both column values and one or more associated delta structures as described herein. In a case that datastore 130 includes more than one data volume, columnar data 1322 may be spread across one or more of its data volumes. As mentioned above, data volume 132 may also store data pages including row-based data, object data and associated index entries.

Data volume 132 includes file directory 1324 and converter 1326. If datastore 130 includes more than one data volume, file directory 1324 and converter 1326 may be spread across one or more of the data volumes. When a new data page is created, the data page is assigned a unique logical page number. Converter 1326 maps this logical page number to the data volume and block address at which the data page is stored. File directory 1324 maps a file identifier to a logical page number of a corresponding file root page, and the aforementioned database catalog maps each file identifier to associated metadata, including a name of a database object associated with the file identifier. Accordingly, the information of the database catalog and file directory 1324 may be used to determine a logical page number from a name of a database object, for example.

The foregoing process also applies to "in-memory" implementations. However, an identifier of a data volume in which a page is stored might not be utilized in such implementations, as the in-memory datastore might simply comprise addressable memory locations which are not divided into logical data volumes.

Cache 120 may be implemented in volatile memory (e.g., Random Access Memory (RAM)) and stores various elements of datastore 130 during execution of database system 100. These elements include recently-accessed columnar tables 122 and their corresponding delta structures 124. Columnar tables 122 and delta structures 124 are illustrated separately herein for the sake of clarity. However, according to some embodiments, columnar tables 122 and delta structures 124 might not comprise separate, contiguous memory addresses of cache 120. Cache 120 may also stores pages of converter 1326 (not shown) and other data pages of data volume 132.

Figure 4A:
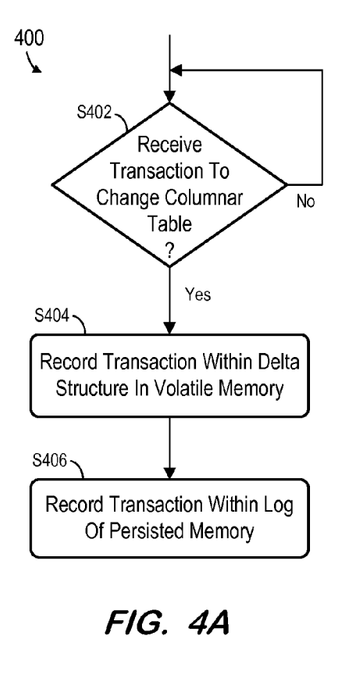
FIGS. 4A through 4C comprise respective flow diagrams of processes according to some embodiments.
Figure 4B:
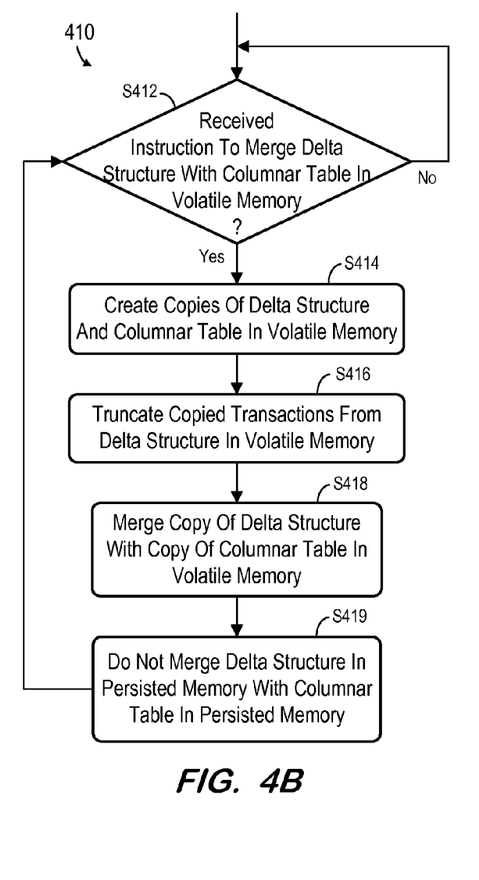
Figure 4C:
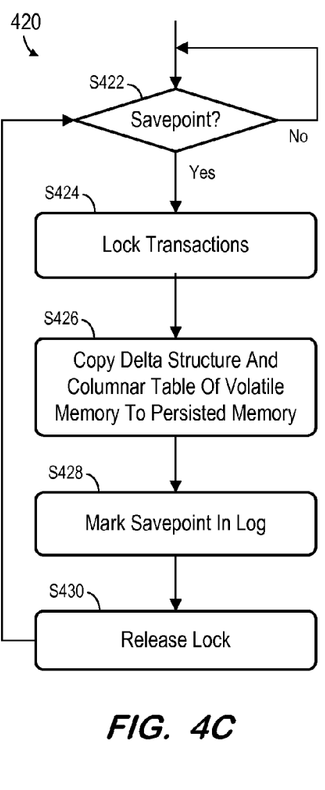

FIGS. 4A through 4C comprise flow diagrams of processes 400, 410 and 420 according to some embodiments. In some embodiments, various hardware elements of a database system execute program code to perform processes 400, 410 and 420. Processes 400, 410 and 420 may be performed by DB server process 110 according to some embodiments.

All processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 400 is executed in response to database transactions on a columnar table. Since such transactions occur often and are ongoing, process 400 occurs asynchronously in some embodiments, and several instantiations of process 400 may occur in parallel. For example, process 400 may be executed before, after or during process 410, which merges the aforementioned delta structure with its corresponding columnar table. An example of such contemporaneous execution will be described below with respect to an embodiment.

Figure 5A:
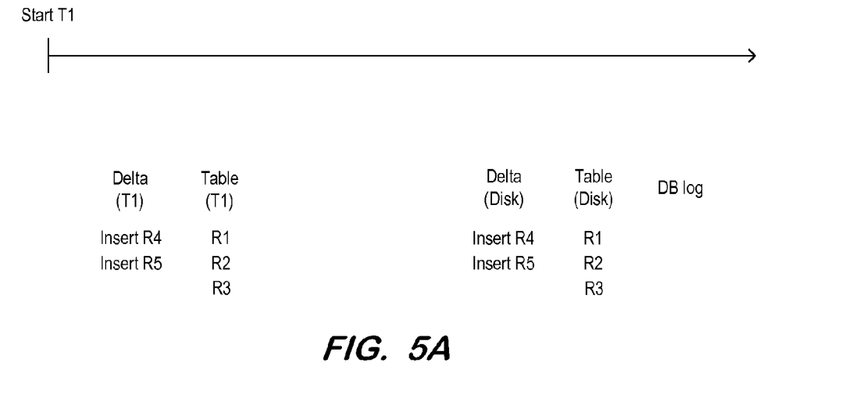
FIGS. 5A through 5L illustrate a sequence including database transactions, delta structure merge, and savepoint execution according to some embodiments.

FIG. 5A illustrates an example of the state of a database at a particular point in time. "Delta" and "Table" on the left side of FIG. 5A represent, respectively, a delta structure associated with a columnar table in volatile memory, and actual data of the columnar table in volatile memory. According to some implementations, this delta structure is stored among delta structures 124 of cache 120 and the columnar table is stored among columnar tables 122 of cache 120.

"Delta" and "Table" on the right side of FIG. 5A represent, respectively, a delta structure associated with a columnar table in persisted memory, and actual data of the columnar table in persisted memory. This delta structure and table may be stored, in some embodiments, among columnar data 1322 of disk volume 132. Also shown in FIG. 5A is a persisted DB log, such as DB log 1328 of disk volume 132. For purposes of the present example, it is assumed that both delta structures of FIG. 5A include transactions "insert R4" and "insert R5", and each table includes records R1, R2 and R3.

Process 400 commences at S402, where flow pauses to wait to receive a transaction to change a columnar table. Similarly, process 410 pauses at 5412 until an instruction to merge a delta structure and a columnar table in volatile memory is received. In the present example, it is assumed that an instruction is received to merge the delta structure and the columnar table depicted in FIG. 5A. This instruction may be triggered based on a size of the delta structure, in some example.

Figure 5B:
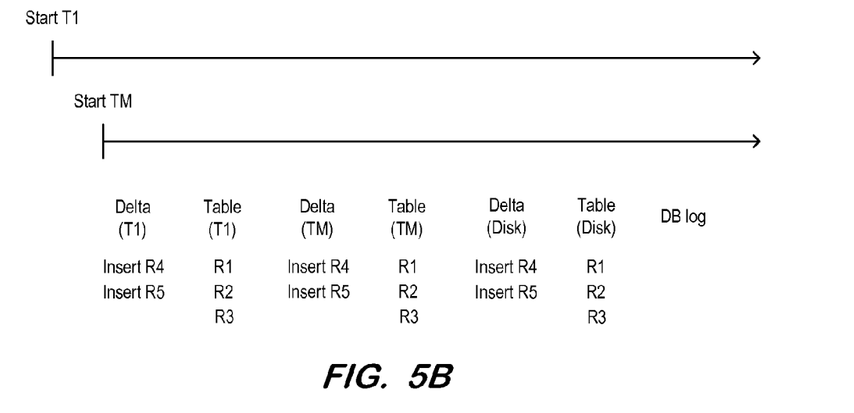

In response to the instruction, copies of the current in-memory delta structure and columnar table are created in volatile memory at S414, as depicted in FIG. 5B. Creation of such copies allows the continued use of the original in-memory delta structure and columnar table (as shown in FIG. 5A) to handle database transactions during execution of process 410.

Figure 5C:
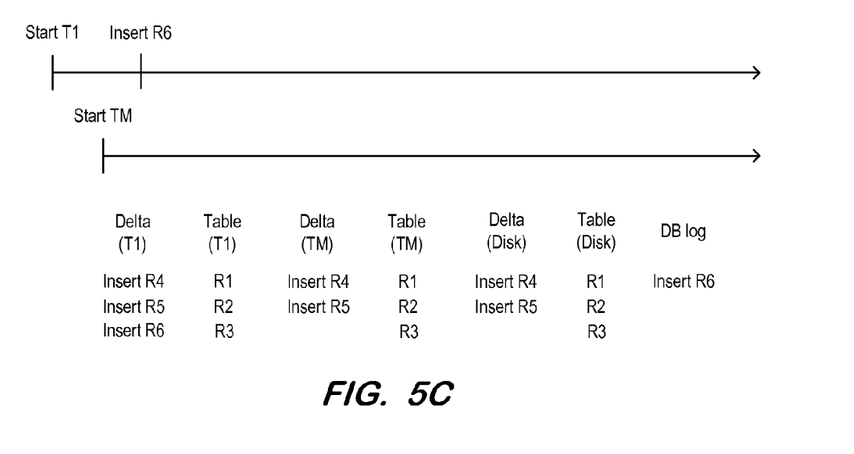

In this regard, FIG. 5C illustrates the receipt of a transaction (i.e., "insert R6") at S404. The transaction may be received from a database application in some embodiments. At S404, the transaction is recorded within the delta structure in volatile memory and, at S406, the transaction is recorded within the log of the persisted memory. Both of these recordations are depicted in FIG. 5C.

Figure 5D:
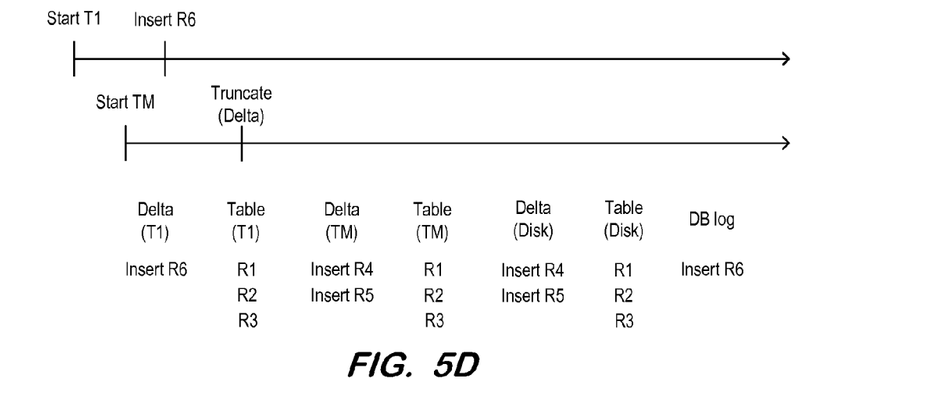
Figure 5E:
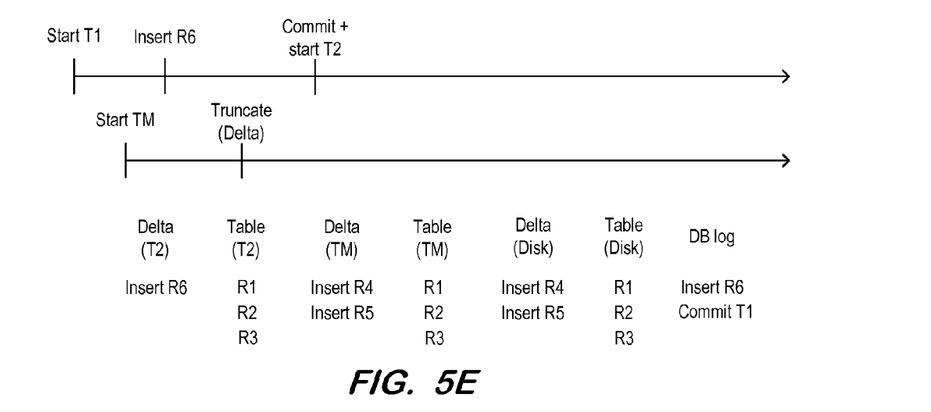

Returning to process 410, the delta structure in volatile memory is truncated at S416 to remove transactions that are specified in the copy of the delta structure, as shown in FIG. 5D. Next, the current transaction "insert R6" is committed and this is reflected in the persisted log as shown in FIG. 5E.

Figure 5F:
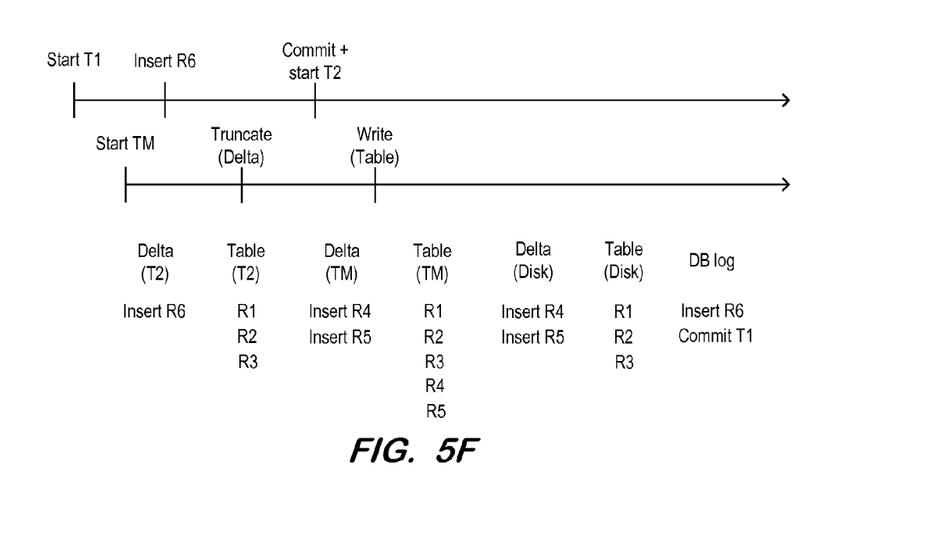
Figure 5G:
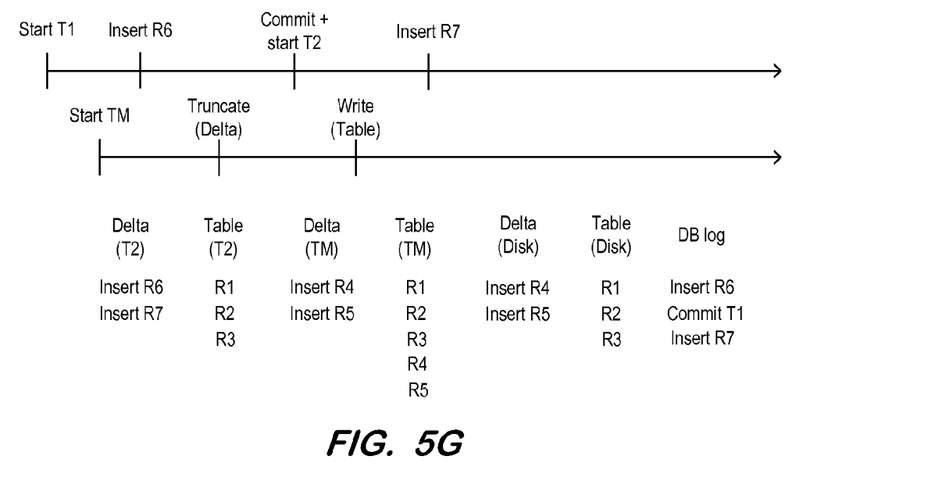

FIG. 5F shows merging of the copied delta structure in volatile memory with its associated copy of the columnar table in volatile memory at S418. In the meantime, FIG. 5G illustrates reception of another transaction at S402 of process 400, as well as recording the transaction in the in-memory delta structure at S404 and in the persisted log at S406.

Figure 5H:
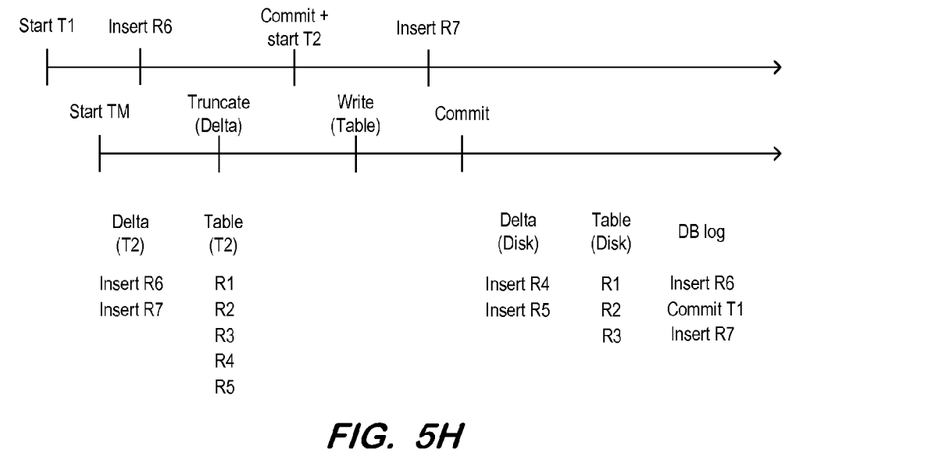

The merge is committed as shown in FIG. 5H, with the merged table depicted therein. As noted in S419, process 410 does not include merging of the corresponding delta structure with its columnar table in persisted memory. Accordingly, these data structures remain unmodified from FIG. 5A through FIG. 5H.

Embodiments are not limited to the relative order of execution described above with respect to processes 400 and 410. Each step of each process may occur without regard to which steps have been or are being executed in the other process.

Figure 5I:
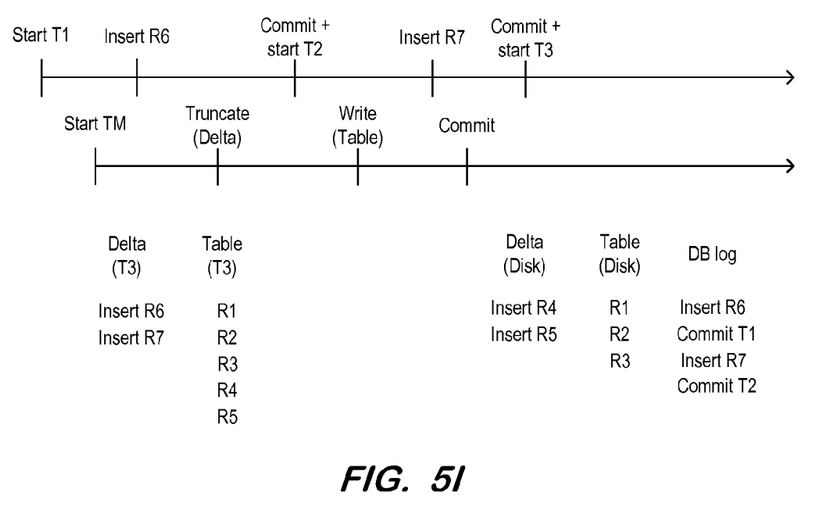

After commission of the current transaction as depicted in FIG. 5I, the present example includes execution of a savepoint. As is known in the art, a savepoint includes flushing any changed data to persisted storage and writing a new restart record, thus activating a new version of a transactionally-consistent state in the persisted storage. Process 420 proceeds from S422 to S424 upon notification of a savepoint.

Figure 5J:
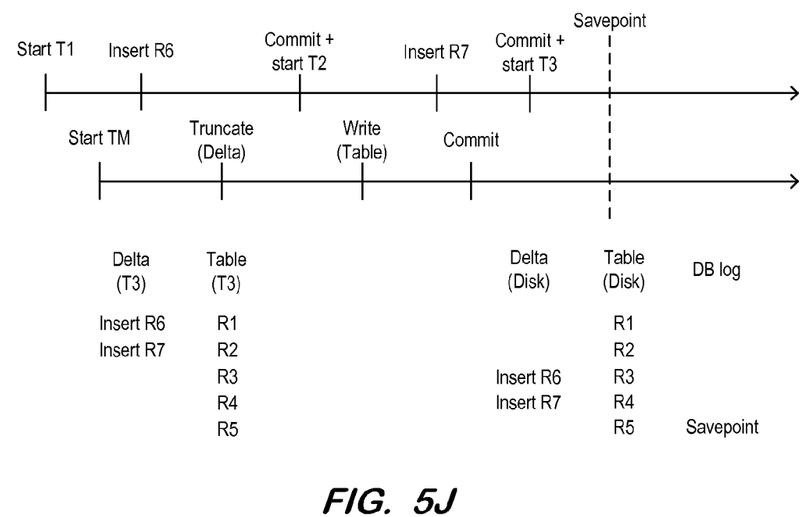

Transactions (i.e., both changes to columnar data and merge transactions) are locked at S424. At S426, the delta structure and the columnar table of the volatile memory are flushed (i.e., copied) to the persisted memory. Also, at S428, a savepoint is marked in the log. S428 may also comprise deleting some or all previous transaction data from the log since it might no longer be needed for crash recovery. FIG. 5J illustrates execution of S426 and S428 according to the present example.

Figure 5K:
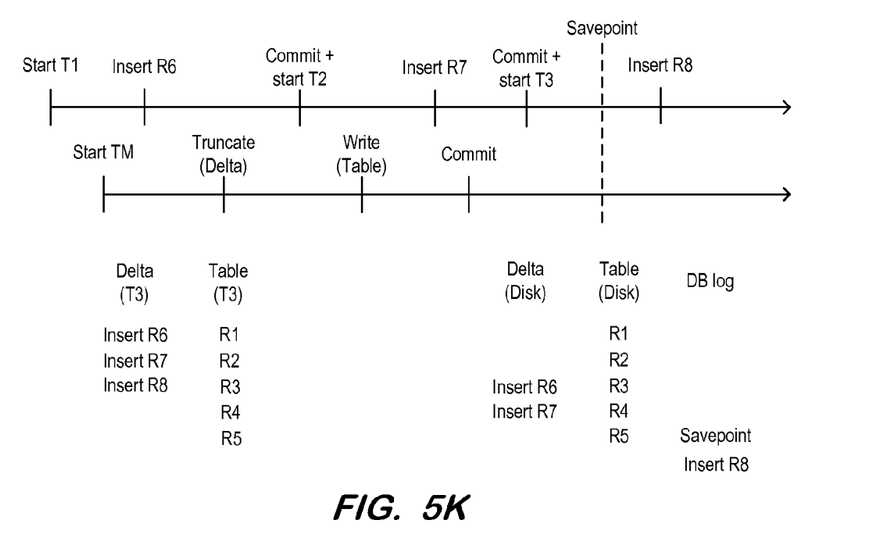

The transaction lock is released at S430. Accordingly, flow may continue as described above after execution of the savepoint to record transactions and conduct merge operations. For example, FIG. 5K illustrates reception of another transaction at S402, and recordation of the transaction at S404 and S406 as described above.

Figure 5L:
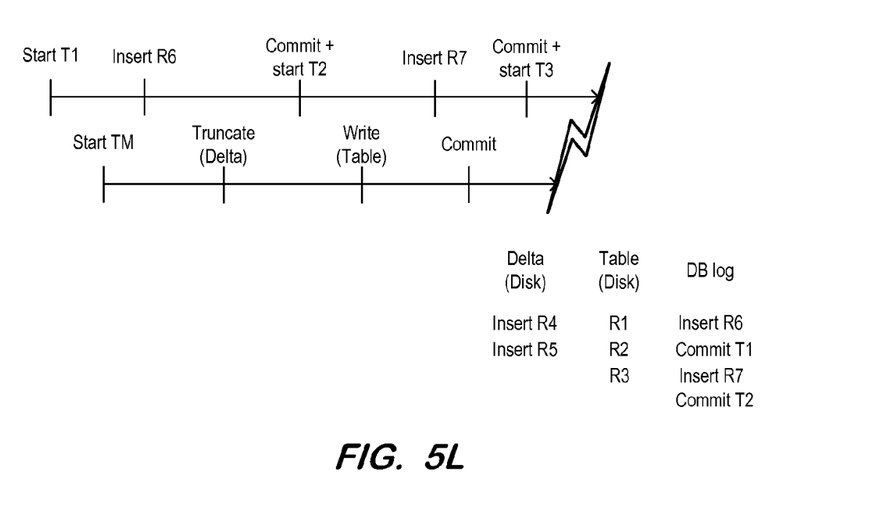

FIG. 5L illustrates a database crash occurring before the savepoint of FIG. 5J. The crash wipes out all the data stored in volatile memory, leaving only the persisted memory as shown in FIG. 5I. FIGS. 6A through 6D illustrate steps to recover from such a crash according to some embodiments.

Figure 6A:
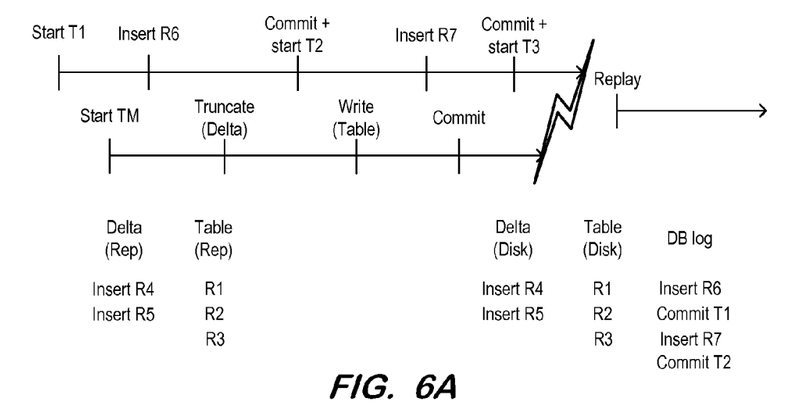
FIGS. 6A through 6D illustrate a recovery sequence according to some embodiments.
Figure 6B:
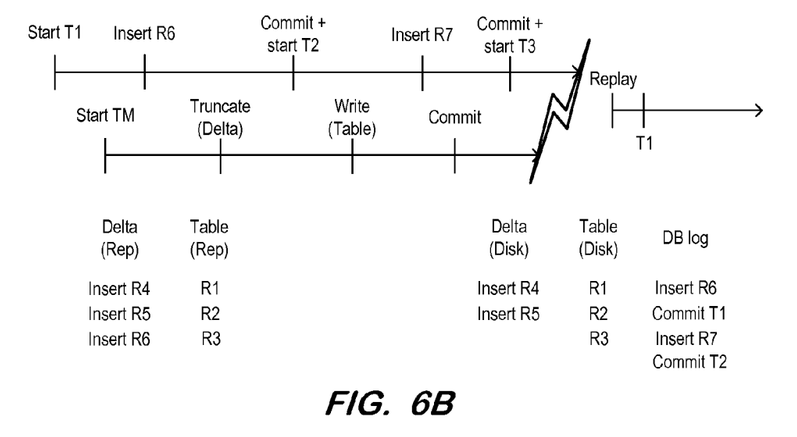
Figure 6C:
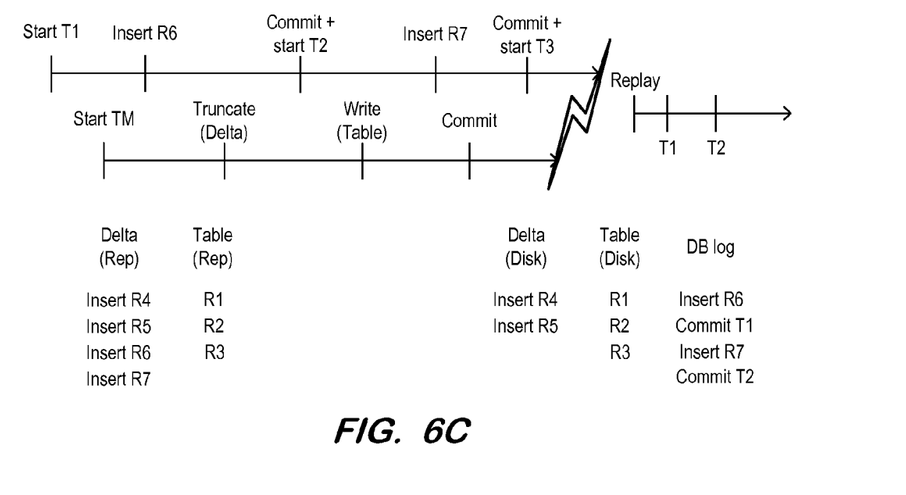

First, as shown in FIG. 6A, the delta structure and the columnar table are copied from persisted memory to volatile memory. Next, the persisted database log is "played back" as if the transactions were received as described above. First, committed transaction "insert R6" is recorded in the delta structure of the volatile memory (see FIG. 6B), and then committed transaction "insert R7" is recorded in the delta structure (see FIG. 6C).

Figure 6D:
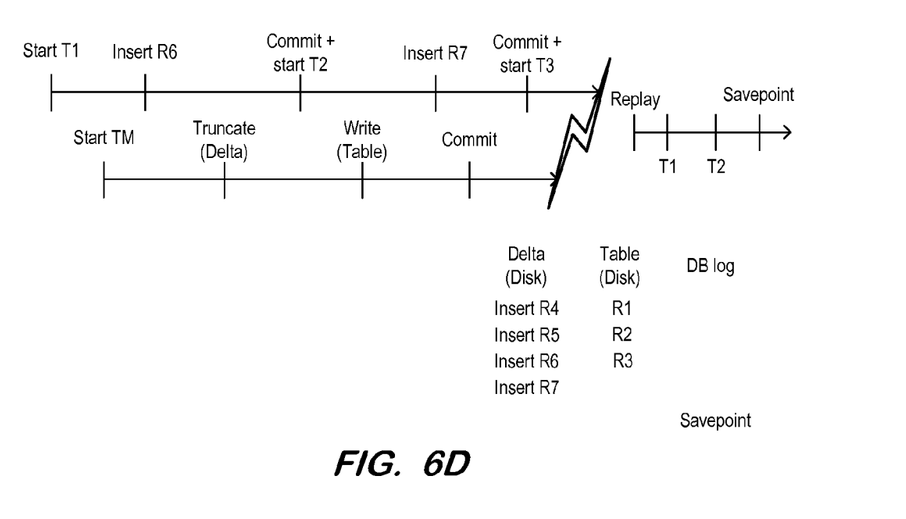

A savepoint is then executed as described above with respect to process 420. More specifically, the delta structure and the columnar table of the volatile memory are copied to the persisted memory. FIG. 6D shows the result of this processing according to the present example. Referring back to FIG. 5J, it is noted that the physical representation of data in the persisted memory is different after crash recovery than in the absence of a crash (i.e., the delta structure is longer). However, in logical terms, the same data is present in both scenarios.

Accordingly, some embodiments of the foregoing features provide consistent backup and recovery of columnar data regardless of when a crash occurs, while reducing the frequency of mergers of persisted data and/or the log size required by conventional systems.

Figure 7:
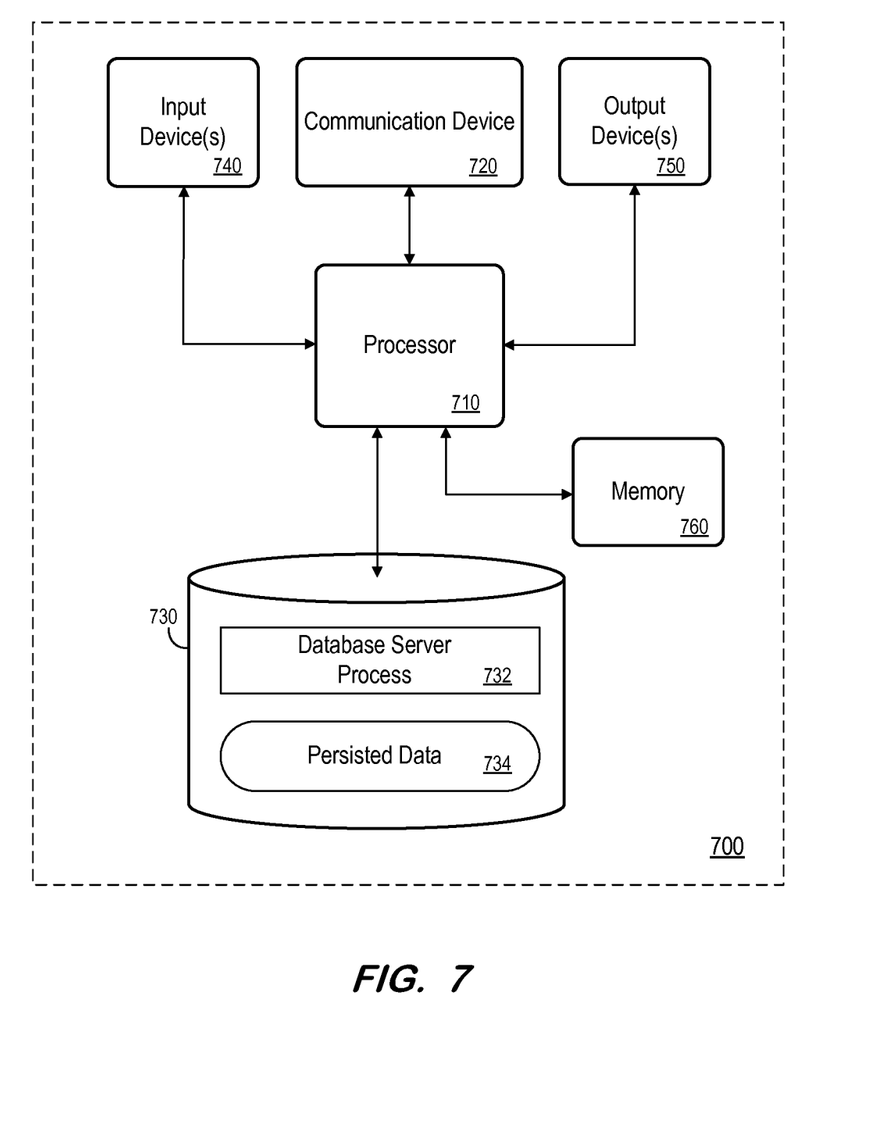
FIG. 7 is a block diagram of a system according to some embodiments.

FIG. 7 is a block diagram of apparatus 700 according to some embodiments. Apparatus 700 may comprise a general-purpose computing apparatus and may execute program code to perform any of the functions described herein. Apparatus 700 may comprise an implementation of database 100. Apparatus 700 may include other unshown elements according to some embodiments.

Apparatus 700 includes processor 710 operatively coupled to communication device 720, data storage device 730, one or more input devices 740, one or more output devices 750 and memory 760. Communication device 720 may facilitate communication with external devices, such as a reporting client, or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Program code of database server process 732 may be executed by processor 710 to cause apparatus 700 to perform any one or more of the processes described herein. Embodiments are not limited to execution of these processes by a single apparatus. Persisted data 734 may columnar tables, delta structures and other data described with respect to datastore 130, while memory 760 may store columnar tables, delta structures and other data described above as being stored in a volatile memory. Data storage device 730 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A method for a database system comprising a first instantiation of a columnar table in a volatile memory and a second instantiation of the columnar table in a persisted memory, the method comprising:
    receiving a transaction to change the columnar table;
    recording the transaction within a delta structure in the volatile memory;
    recording the transaction within a log of the persisted memory;
    receiving an instruction to merge the delta structure in the volatile memory with the first instantiation of the columnar table in the volatile memory;
    in response to the instruction, merging the delta structure in the volatile memory with the first instantiation of the columnar table in the volatile memory to create a merged columnar table in the volatile memory, and not storing the merged columnar table in the persisted memory;
    receiving an instruction to execute a savepoint; and
    in response to the instruction to execute the savepoint, copying the delta structure in the volatile memory to the persisted memory, and copying the merged columnar table in the volatile memory to the persisted memory.

2. A non-transitory computer-readable medium storing program code, the program code executable by a computing system storing a first instantiation of a columnar table in a volatile memory and a second instantiation of the columnar table in a persisted memory, the program code comprising:
    code to receive a transaction to change the columnar table;
    code to record the transaction within a delta structure in the volatile memory;
    code to record the transaction within a log of the persisted memory;
    code to receive an instruction to merge the delta structure in the volatile memory with the first instantiation of the columnar table in the volatile memory;
    code to, in response to the instruction, merge the delta structure in the volatile memory with the first instantiation of the columnar table in the volatile memory to create a merged columnar table in the volatile memory, and not store the merged columnar table in the persisted memory;
    code to receive an instruction to execute a savepoint; and
    code to, in response to the instruction to execute the savepoint, copy the delta structure in the volatile memory to the persisted memory, and copy the merged columnar table in the volatile memory to the persisted memory.

3. A system comprising:
    a volatile memory storing a first instantiation of a columnar table;
    a persisted memory storing a second instantiation of the columnar table;
    a memory storing processor-executable process steps; and
    a processor to execute the processor-executable process steps to cause the system to:
    receive a transaction to change the columnar table;
    record the transaction within a delta structure in the volatile memory;
    record the transaction within a log of the persisted memory;
    receive an instruction to merge the delta structure in the volatile memory with the first instantiation of the columnar table in the volatile memory;
    in response to the instruction, merge the delta structure in the volatile memory with the first instantiation of the columnar table in the volatile memory to create a merged columnar table in the volatile memory, and not store the merged columnar table in the persisted memory;
    receive an instruction to execute a savepoint; and
    in response to the instruction to execute the savepoint, copy the delta structure in the volatile memory to the persisted memory, and copy the merged columnar table in the volatile memory to the persisted memory.

4. A method for a database system comprising a first instantiation of a columnar table in a volatile memory and a second instantiation of the columnar table in a persisted memory, the method comprising:
    receiving a transaction to change the columnar table;
    recording the transaction within a delta structure in the volatile memory;
    recording the transaction within a log of the persisted memory;
    receiving an instruction to merge the delta structure in the volatile memory with the first instantiation of the columnar table in the volatile memory; and
    in response to the instruction, merging the delta structure in the volatile memory with the first instantiation of the columnar table in the volatile memory to create a merged columnar table in the volatile memory, and not storing the merged columnar table in the persisted memory;
    wherein merging the delta structure in the volatile memory with the first instantiation of the columnar table in the volatile memory is asynchronous to receiving transactions to change the columnar table, recording the transactions within the delta structure in the volatile memory, and recording the transactions within the log of the persisted memory;

the method further comprising:

receiving an instruction to execute a savepoint; and in response to the instruction, copying the delta structure in the volatile memory to the persisted memory, and copying the merged columnar table in the volatile memory to the persisted memory.

5. A method according to claim 1, wherein merging the delta structure in the volatile memory with the first instantiation of the columnar table in the volatile memory is asynchronous to receiving transactions to change the columnar table, recording the transactions within the delta structure in the volatile memory, and recording the transactions within the log of the persisted memory.

6. A method according to claim 1, further comprising:

receiving an instruction to recover from a database crash; and in response to the instruction, copying the delta structure in the persisted memory to the volatile memory;

copying the second instantiation of the columnar table in the persisted memory to the volatile memory; and committing the transaction recorded within the log to the copied delta structure in the volatile memory.

7. A method according to claim 1, further comprising:

receiving an instruction to execute a savepoint; and in response to the instruction, copying the delta structure in the volatile memory to the persisted memory, and copying the merged columnar table in the volatile memory to the persisted memory.

8. A medium according to claim 2, wherein the code to merge the delta structure in the volatile memory with the first instantiation of the columnar table in the volatile memory is asynchronous with the code to receive the transaction to change the columnar table, the code to record the transaction within the delta structure in the volatile memory, and the code to record the transaction within the log of the persisted memory.

9. A medium according to claim 2, the program code further comprising:

code to receive an instruction to recover from a database crash; and code to, in response to the instruction, copy the delta structure in the persisted memory to the volatile memory;

copy the second instantiation of the columnar table in the persisted memory to the volatile memory; and commit the transaction recorded within the log to the copied delta structure in the volatile memory.

10. A medium according to claim 2, the program code further comprising:

code to receive an instruction to execute a savepoint; and code to, in response to the instruction, copy the delta structure in the volatile memory to the persisted memory, and copy the merged columnar table in the volatile memory to the persisted memory.

11. A system according to claim 3, wherein the merging of the delta structure in the volatile memory with the first instantiation of the columnar table in the volatile memory is asynchronous with reception of transactions to change the columnar table, recordation of the transactions within the delta structure in the volatile memory, and recordation of the transactions within the log of the persisted memory.

12. A system according to claim 3, the processor further to execute the processor-executable process steps to cause the system to:

receive an instruction to recover from a database crash; and in response to the instruction, copy the delta structure in the persisted memory to the volatile memory;

copy the second instantiation of the columnar table in the persisted memory to the volatile memory; and commit the transaction recorded within the log to the copied delta structure in the volatile memory.

13. A system according to claim 3, the processor further to execute the processor-executable process steps to cause the system to:

receive an instruction to execute a savepoint; and in response to the instruction, copy the delta structure in the volatile memory to the persisted memory, and copy the merged columnar table in the volatile memory to the persisted memory.

14. A method according to claim 7, further comprising:

receiving an instruction to recover from a database crash; and in response to the instruction, copying the delta structure in the persisted memory to the volatile memory;

copying the second instantiation of the columnar table in the persisted memory to the volatile memory; and committing the transaction recorded within the log to the copied delta structure in the volatile memory.

15. A medium according to claim 10, the program code further comprising:

code to receive an instruction to recover from a database crash; and code to, in response to the instruction, copy the delta structure in the persisted memory to the volatile memory;

copy the second instantiation of the columnar table in the persisted memory to the volatile memory; and commit the transaction recorded within the log to the copied delta structure in the volatile memory.

16. A system according to claim 13, the processor further to execute the processor-executable process steps to cause the system to:

receive an instruction to recover from a database crash; and in response to the instruction, copy the delta structure in the persisted memory to the volatile memory;

copy the second instantiation of the columnar table in the persisted memory to the volatile memory; and commit the transaction recorded within the log to the copied delta structure in the volatile memory.

* * * * *